United States Patent
Manglik et al.

(10) Patent No.: US 7,962,788 B2
(45) Date of Patent: Jun. 14, 2011

(54) AUTOMATED TREATMENT OF SYSTEM AND APPLICATION VALIDATION FAILURES

(75) Inventors: Gaurav Manglik, Palo Alto, CA (US); Bharat Paliwal, Fremont, CA (US); Vishwanath S. Sastry, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 1064 days.

(21) Appl. No.: 11/738,946

(22) Filed: Apr. 23, 2007

(65) Prior Publication Data

US 2007/0288903 A1 Dec. 13, 2007

Related U.S. Application Data

(63) Continuation-in-part of application No. 11/123,476, filed on May 5, 2005, which is a continuation-in-part of application No. 10/901,831, filed on Jul. 28, 2004, now Pat. No. 7,536,599.

(51) Int. Cl.
*G06F 11/00* (2006.01)
(52) U.S. Cl. ............. 714/25; 714/21; 714/37; 717/124; 717/168; 703/1
(58) Field of Classification Search .................. 714/25, 714/21, 37; 717/124, 125, 168; 703/1
See application file for complete search history.

(56) References Cited

U.S. PATENT DOCUMENTS

| | | | |
|---|---|---|---|
| 5,564,051 A | 10/1996 | Halliwell et al. | |
| 5,692,106 A | 11/1997 | Towers et al. | |
| 5,822,531 A | 10/1998 | Gorczyca et al. | |
| 6,041,324 A | 3/2000 | Earl et al. | |
| 6,305,010 B2* | 10/2001 | Agarwal | 717/126 |
| 6,385,766 B1* | 5/2002 | Doran et al. | 717/174 |
| 6,502,102 B1* | 12/2002 | Haswell et al. | 1/1 |
| 6,523,027 B1* | 2/2003 | Underwood | 1/1 |
| 6,546,547 B1* | 4/2003 | Runyan et al. | 717/124 |
| 6,560,699 B1 | 5/2003 | Konkle | |
| 6,615,255 B1 | 9/2003 | Blaszczak | |
| 6,633,891 B1 | 10/2003 | Bamford et al. | |
| 6,665,634 B2 | 12/2003 | Taft et al. | |
| 6,671,874 B1 | 12/2003 | Passova | |
| 6,707,313 B1* | 3/2004 | Rohrbaugh et al. | 324/765 |
| 6,748,380 B2* | 6/2004 | Poole et al. | 1/1 |
| 6,862,686 B1* | 3/2005 | Bahrs et al. | 726/3 |
| 6,954,930 B2 | 10/2005 | Drake et al. | |
| 7,089,139 B2* | 8/2006 | Loh et al. | 702/117 |
| 7,242,683 B2* | 7/2007 | Saint Etienne et al. | 370/389 |
| 7,398,272 B2* | 7/2008 | Hindawi et al. | 1/1 |
| 7,418,484 B2* | 8/2008 | Presley | 709/220 |

(Continued)

FOREIGN PATENT DOCUMENTS

GB 2 368 682 5/2002

(Continued)

*Primary Examiner* — Scott T Baderman
*Assistant Examiner* — Loan Truong
(74) *Attorney, Agent, or Firm* — Kilpatrick Townsend & Stockton LLP

(57) ABSTRACT

Automated tools to validate a system environment for an application (and/or any other type of software component) and/or repair system environment conditions that might prevent the proper installation and/or functioning of the application or component are presented. Such tools can facilitate the installation and/or upgrade of software by automating the process of ensuring that all necessary requirements for the proper functioning of the software have been met.

32 Claims, 9 Drawing Sheets

U.S. PATENT DOCUMENTS

| | | |
|---|---|---|
| 7,437,614 B2 * | 10/2008 | Haswell et al. ............... 714/38 |
| 2001/0008019 A1 | 7/2001 | Vert et al. |
| 2001/0056462 A1 | 12/2001 | Kataoka |
| 2002/0049859 A1 | 4/2002 | Bruckert et al. |
| 2002/0052937 A1 | 5/2002 | Jager |
| 2002/0083318 A1 * | 6/2002 | Larose ...................... 713/164 |
| 2002/0133727 A1 | 9/2002 | Dervin et al. |
| 2002/0156951 A1 | 10/2002 | Beeston et al. |
| 2002/0194015 A1 | 12/2002 | Gordon |
| 2002/0198967 A1 | 12/2002 | Iwanojko |
| 2002/0198968 A1 | 12/2002 | Shirriff |
| 2003/0018699 A1 | 1/2003 | Matthews et al. |
| 2003/0018927 A1 | 1/2003 | Gadir et al. |
| 2003/0074426 A1 | 4/2003 | Dervin et al. |
| 2003/0126504 A1 | 7/2003 | Ryan et al. |
| 2003/0182650 A1 | 9/2003 | Smith |
| 2003/0182656 A1 | 9/2003 | Leathers et al. |
| 2003/0187927 A1 | 10/2003 | Winchell |
| 2003/0208750 A1 | 11/2003 | Tapper |
| 2003/0220951 A1 | 11/2003 | Muthulingam et al. |
| 2003/0220992 A1 * | 11/2003 | DiRico ......................... 709/221 |
| 2003/0225866 A1 * | 12/2003 | Hudson ........................ 709/221 |
| 2003/0227477 A1 | 12/2003 | Kadiwala |
| 2004/0006610 A1 | 1/2004 | Anagol-Subbarao et al. |
| 2004/0019820 A1 | 1/2004 | Whitlow |
| 2004/0083199 A1 * | 4/2004 | Govindugari et al. ............ 707/1 |
| 2004/0106088 A1 | 6/2004 | Driscoll et al. |
| 2004/0107415 A1 * | 6/2004 | Melamed et al. ............. 717/124 |
| 2004/0153478 A1 * | 8/2004 | Igouchkine .................. 707/200 |
| 2004/0193388 A1 * | 9/2004 | Outhred et al. .................... 703/1 |
| 2004/0210653 A1 * | 10/2004 | Kanoor et al. ................ 709/223 |
| 2004/0250191 A1 * | 12/2004 | Leaming ....................... 714/742 |
| 2004/0260674 A1 * | 12/2004 | Primm ............................. 707/1 |
| 2005/0234680 A1 * | 10/2005 | Dettinger et al. ............. 702/182 |
| 2005/0240763 A9 * | 10/2005 | Bhat et al. .................... 713/169 |
| 2005/0257208 A1 * | 11/2005 | Blumfield et al. ............ 717/168 |
| 2006/0010426 A1 * | 1/2006 | Lewis et al. .................. 717/124 |
| 2006/0026463 A1 * | 2/2006 | Paliwal et al. ................... 714/37 |
| 2006/0026690 A1 * | 2/2006 | Yu et al. .......................... 726/27 |
| 2006/0048134 A1 * | 3/2006 | Napier et al. ................. 717/169 |
| 2006/0080656 A1 * | 4/2006 | Cain et al. .................... 717/174 |
| 2006/0143596 A1 * | 6/2006 | Miyashita et al. ........... 717/131 |

FOREIGN PATENT DOCUMENTS

| | | |
|---|---|---|
| WO | WO99/24945 | 5/1999 |
| WO | WO02/46914 | 6/2002 |
| WO | WO03/048994 | 6/2003 |
| WO | WO 03/073278 | 9/2003 |

* cited by examiner

AUTOMATED TREATMENT OF SYSTEM AND APPLICATION VALIDATION FAILURES

CROSS-REFERENCES TO RELATED APPLICATIONS

This application is a continuation-in-part of U.S. patent application Ser. No. 11/123,476, filed May 5, 2005 by Paliwal et al. and entitled "Integration of Heterogeneous Application-Level Validations," which is a continuation-in-part of U.S. patent application Ser. No. 10/901,831, filed Jul. 28, 2004 by Paliwal et al. and entitled "Methods and Systems for Validating a System Environment."

The entire disclosures of these applications (the "Related Applications") are hereby incorporated herein by reference for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates generally to installation and/or integration of software applications, and, more specifically, to validating a system environment for a software application and/or repairing any conditions resulting in validation failures.

BACKGROUND

Many software applications have system environment requirements that must be fulfilled for the application to execute properly. In a scenario in which one application is to be integrated with another application, such as with integration of a database application with a database management system, the database management system environment must meet the integrated application's system environment requirements in order for the application to function properly. If the system requirements are not met, then the application may not install properly or the application may install but behave unpredictably, possibly resulting in system corruption.

To avoid problems with a system environment, application installation developers may write custom libraries to check for, or validate, system environment properties (e.g., system parameters, OS versions, packages, patches, service packs, etc.) in an automated manner. While avoiding problems that may occur by relying on a user manually performing all of the prerequisite system environment checks ("validation checks") for an application, custom program code may lead to other problems.

For example, validation checks may not be modified, or new checks added, without re-releasing the application and installation modules. Thus, the validation checks that are to be performed in association with a given operation (e.g., an install operation), as well as the reference information on which a validation check relies, are relatively static in nature. Each system property to be validated for a given application has a single fixed value requirement for the application, for checking against the actual system property. For example, a given application may have a requirement for a particular amount of RAM in order to function properly. Additionally, there is no capability for introducing interdependencies between various validation checks.

Furthermore, different sets of validation checks might need to be performed depending on the operation being performed in association with the application. For example, the following may affect the set of checks to perform: (a) whether the operation is being performed on a single stand-alone machine or clustered machines, and (b) whether the operation being performed is an install operation, an upgrade operation, adding languages, etc.

Still further, validation frameworks typically do not scale well and, therefore, fail to adequately support or function well as more and more application products are integrated into a single system, such as when installing interdependent suites of products.

Moreover, it would be beneficial, in some circumstances, if a validation tool were able to repair some or all of the conditions that gave rise to a validation failure.

Each of the foregoing desirable features would provide value that is independent of the other desirable features. Furthermore, the approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

Embodiments of the invention provide automated tools to validate a system environment for an application (and/or any other type of software component) and/or system environment conditions that might prevent the proper installation and/or functioning of the application or component. In an aspect, certain embodiments advantageously facilitate the installation and/or upgrade of software by automating the process of ensuring that all necessary requirements for the proper functioning of the software have been met.

Such tools can include, without limitation, methods, systems and/or software products. Merely by way of example, some embodiments provide methods, while other embodiments provide systems that are configured to perform such methods. Such a system my comprise, for instance, one or more processors and a computer readable medium (e.g. a hard disk, etc.). The computer readable medium might have embodied thereon a set of instructions (which may be incorporated in a software program) executable by the processor(s) to perform one or more procedures in accordance with methods of the invention. Similarly, a software product, which might be embodied on a computer readable medium, such as a hard disk, optical media, etc., might comprise instructions that are executable by one or more computers to perform procedures in accordance with methods of the invention.

An exemplary system in accordance with one set of embodiments comprises a processor and a computer readable medium in communication with the processor. The computer readable medium has encoded thereon a software program. In a particular embodiment the software program comprises a validation engine, a listener, and a repair engine.

In an aspect, the validation engine is configured to receive a set of validation check data for validating a system environment for an application. The validation check data might comprise information about one or more requirements for proper functioning of the application. Accordingly, in some embodiments, the validation engine is configured to perform one or more validation checks (e.g. as defined by the set of validation check data). The validation checks pertain to one or more of the requirements. Based on the validation check(s), the validation engine might be configured to identify a system environment condition that needs to be repaired for proper functioning of the application. In an embodiment, the validation engine generates output (e.g., an event) comprising information about the identified system environment condition.

In accordance with one set of embodiments, the listener is configured to receive the output generated by the validation engine. Based, perhaps, on the data about the identified system environment condition, the listener may be configured to invoke the repair engine to repair the identified system environment condition. The repair engine, in an aspect, is configured to evaluate a repair rule corresponding to the identified system environment condition. Based at least in part on this valuation, the repair engine may be configured to perform a set of one or more operations to repair the identified system condition. In many cases, this repair can be performed in response the repair engine being invoked the by the listener and or without user input to the repair engine.

An exemplary method in accordance with another set of embodiments may be implemented in a computer system. The exemplary method might comprise receiving a set of validation check data for validating the system environment for application and/or performing one or more validation checks defined by the set of validation check data. Based at least in part on the validation check a system environment condition may be an identified. In an aspect, the system environment condition may need to be repaired for proper functioning of the application. Hence, the method might comprise evaluating a repair rule corresponding to the identified system environment condition. Based at least in part on this valuation one or more repair operations may be performed to repair the identified system environment condition, so that the application can function properly.

A method in accordance with another embodiment comprises storing first data and identifies first validation checks for validating a system environment for first application. The first application may use a second application. Hence, the method may further comprise storing second data that identifies second validation checks for validating a system environment for the second application, and/or storing third data that indicates that the first application uses the second application. The method, comprises reading the third data, in response to a request to perform an operation that involves the first application, to determine the validation checks identified in the first and second data need to be performed. The first and second data then maybe read to determine which validation checks of the first and second validation checks need to be performed, and/or one or more of these validation checks may be performed. Based on these validation check(s) identifying a system environment condition that needs to be repair for proper functioning of the application. Based at least in part on this evaluation, one or more operations may be performed to repair the identified system environment condition.

Another exemplary method comprises storing, in association with an application, data that identifies validation checks for validating a system environment for the application. In some cases, the data associates each mode of a plurality of modes with a subset of the validation checks. In response to a request to perform an operation that involves the application, the method may comprise determining a mode, of the plurality of modes, associated with the operation. Based on the data, the particular subset of validation checks that are associated with the mode may be determined, and at least one validation check in at subset may be performed.

In an aspect, the method comprises identifying, based on the validation check, a system environment condition that needs to be repaired for proper functioning of the application. In certain embodiments, the method further comprises evaluating a repair rule corresponding to the identified system environment condition and/or, based at least in part on this valuation, performing one or more operations to repair the identified system environment condition.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION

Figure 1A:
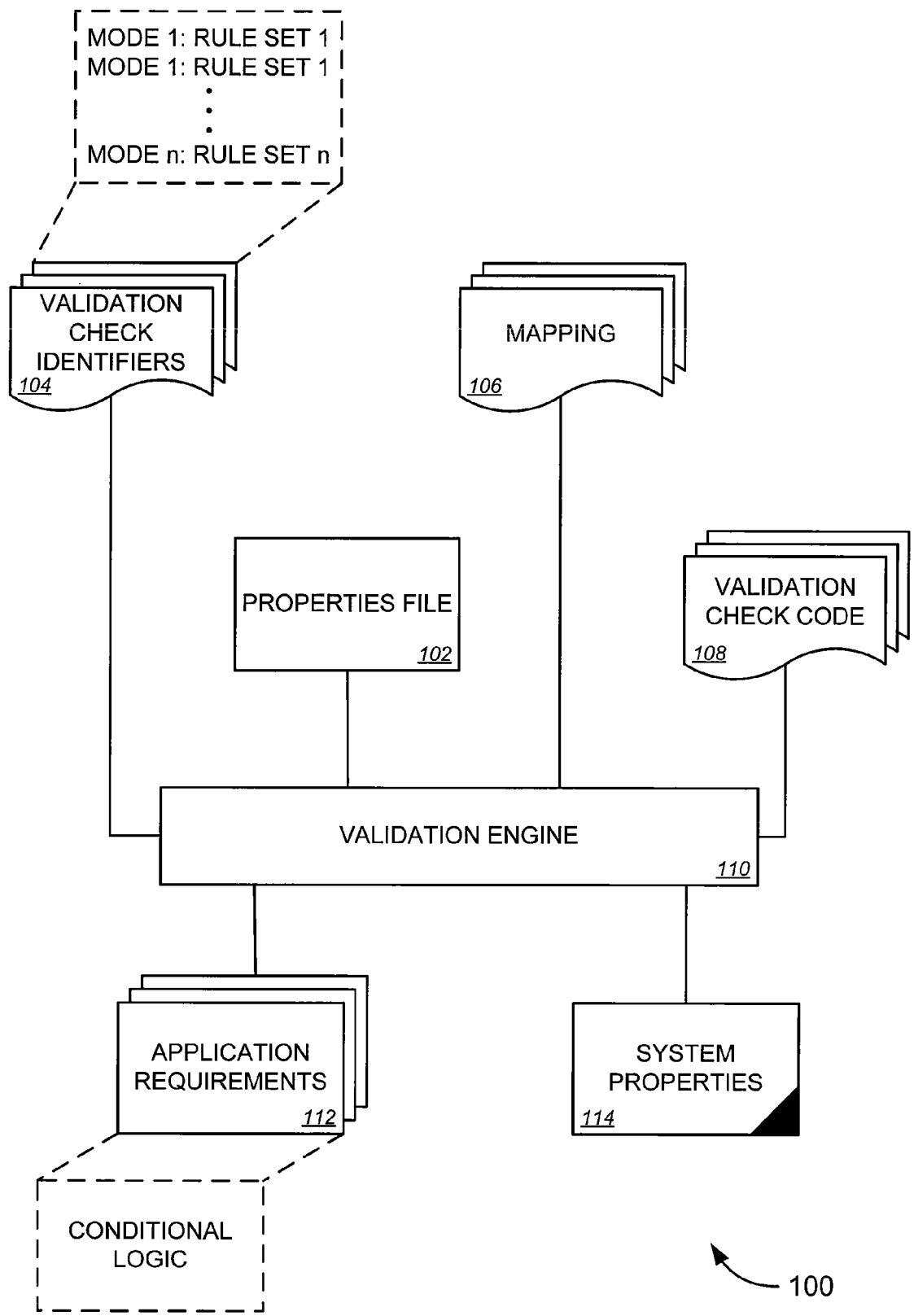
FIG. 1A is a block diagram that illustrates a validation system for validating the properties of a system against the requirements of a software application, according to various embodiments of the invention.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below, and while various features are ascribed to different embodiments, it should be appreciated that the features described with respect to one embodiment may be incorporated with another embodiments as well. By the same token, however, no single feature or features of any described embodiment should be considered essential to the invention, as other embodiments of the invention may lack such features.

Techniques are described for, generally, checking whether system properties meet the requirements of a software application. Such requirements typically include system hardware requirements (e.g., CPU speed, memory availability, and the like), operating system (OS) requirements (e.g., OS version, OS packages, OS service packs, and the like), and configuration requirements (e.g., swap space, user privileges, etc.). These checks are performed by executing validation checks associated with the application, which often include validation checks associated with other applications with which the application integrates.

Accordingly, a validation check system is described in which a validation engine takes several inputs that "drive" the validation checking that is performed in conjunction with an operation associated with an application. These inputs include validation check identifiers that identify checks of the system that need to be performed, associated code that embodies the validation checks, and "knowledge sources" from which the validation engine obtains the application requirements and the system properties that need to be compared in order to validate that the system properties meet the application's requirements. The architecture of the system provides a flexible and extensible validation platform for integrating applications and suites of applications, such as integrating a database application suite with a database management system.

In one set of embodiments, a validation check system also includes a tool for repairing one or more conditions that result in failure of a validation check. In one aspect this repair tool is modular as well. Merely by way of example, a repair rule can be provided as one of the inputs to the validation engine and/or to a separate repair engine. These repair rules than can be used by a repair engine to fix any conditions flagged by the validation engine. Beneficially, this automated repair process can save time and/or inconvenience for user, as well as provide more effective repair of any conditions found. Merely by way of example, through the use of a repair engine in accordance with embodiments of the invention, the need for a user to investigate repair procedures can be mitigated or eliminated. Moreover, because the repair rule specifies the necessary procedures that the repair engine undertakes, there is a lower probability of errors, such as mistyping commands, inputting incorrect in one commands, and/or the like.

In one aspect of the invention, a modular approach to integrating an application's validation checks with other applications' validation checks is provided via a properties file that contains metadata for all the files in the system. The properties file is extended to support multiple input files of a given type (e.g., a type file for each integrated application). Therefore, a validation engine is capable of recognizing from the properties file that input is coming from several sources of the same type of input. Consequently, a primary application validation module only needs to include the primary application's input files, with references (e.g., pointers) in the properties file to any integrated applications' validation input files. Thus, the primary application developer is not required to rework the files to manually integrate the integrated applications' validation modules. Furthermore, integration of multiple applications' validation modules occurs at the metadata level, without requiring changes to the underlying input files, which are pluggable into the validation system.

In another aspect of the invention, conditional logic is introduced into a knowledge source so that similar logic does not need to be in the validation test code. Consequently, the knowledge source is dynamic in nature and can be used to direct the validation engine as to which validation checks to execute, or what parameters to input to a particular validation check.

In another aspect of the invention, the validation test identifiers input is extended to support multiple modes of operation. Consequently, different rule sets (comprising a set of validation checks and associated validation check code) can be developed for different modes, integrated with each other, and exposed in the validation check identifiers input file. Because the validation check identifiers input is the processing entry point to the actual validation checks performed by the validation engine, the validation check identifiers are used to dictate which validation checks to perform for a given mode of operation. Thus, depending on what product, what type of operation (e.g., install versus update), and what type of system environment (e.g., stand-alone versus cluster) a user selects, validation engine can determine what is the appropriate subset of validation checks to invoke, based on information in the appropriate validation test identifiers input.

These techniques can be used, for a non-limiting example, in the context of managing a computing grid on which a wide variety of applications execute, often in an integrated manner. For each application, a set of validations for respective modes of operation can be easily integrated into a single composite validation system used to manage validation processes for applications on the grid. The validation system is used to ensure that the systems and platforms on which each application executes meet the minimum requirements for a given operation associated with a corresponding application, and can scale concurrent with the growing demands on the grid.

FIG. 1A is a block diagram that illustrates a validation system for validating the properties of a system against the requirements of a software application, according to embodiments of the invention.

In an aspect of certain embodiments, a validation module is constructed for each application for which the validation engine 110 is to be used for performing system requirements checks. A validation module can be constructed in association with numerous types of operations, for non-limiting examples, software application installation and updating, and database creation. A validation module can be constructed with respect to numerous types of system environment requirements, such as software, hardware, and network requirements. A validation module comprises one or more validation check identifiers 104, one or more mappings 106, one or more validation check code 108, and one or more application requirements 112 and system properties 114 knowledge sources.

Each validation check identifier 104 identifies the validation checks that are to be executed in order to validate the system environment properties against the application's requirements. A validation check identifier 104 may be in the form of a file, such as an XML file, that lists the appropriate checks to perform to validate the system environment in conjunction with performing an operation associated with the application. Such operations may include, for non-limiting examples, an application install operation, an application upgrade operation, adding languages to an application, and the like. The operation being performed typically dictates what validation checks need to be performed. Furthermore, each operation may have an associated mode, such as standalone mode and cluster mode, which also may dictate what validation checks need to be performed.

Each mapping 106 is a mapping (e.g., a table) of validation check identifiers to validation check code. Thus, for a given application validation module, mapping 106 maps each validation check identifier listed in validation check identifiers 104 to corresponding validation check code 108. Validation check code 108 is the executable code which, when executed by one or more processors, performs the validation checks that check whether or not the system environment properties meet the application's system requirements. Each validation check code 108 may, in implementations, contain respective programming code (i.e., one or more sequences of instructions) for each respective validation check listed in validation check identifiers 104, and information as to how to invoke the code.

As described in U.S. patent application Ser. No. 10/901,831, validation engine (also referred to as a "rules engine") resolves validation check identifiers 104 to corresponding validation check code 108 via mapping 106, and executes the corresponding check code with parameter input from corresponding application requirements 112 and/or system properties 114 knowledge sources. One example of a knowledge source may be system properties 114 having information on the actual host system for which the system environment is being verified (e.g., the host system on which the application is to be installed). Non-limiting examples of host system information may include available memory, total memory, CPU speed, page/swap size, device capabilities, operating system version, operating system packages installed, applications installed, or other types of host system environment information.

Another type of knowledge source, such as application requirements 112, may be reference information for the application. For example, application requirements 112 may be created for each of the system platforms for which the application has different system environment requirements. Non-limiting examples of system platform knowledge source information may include total/available memory needed by the application to execute on the system platform, operating system version and packages needed by the application to run properly on the system platform, system platform configuration requirements, and other types of information specifying the system platform requirements of the application.

Often, to perform an operation for a "primary" application (for a non-limiting example, installing an application that accesses a database), the primary application's validation checks must be executed as well as certain validation checks for the "integrated" application, i.e., the application with which the application is integrating (e.g., the database server). In other words, the system environment properties are validated to ensure that both the primary application's requirements and at least some of the integrated application's system requirements are met. Furthermore, sometimes both the primary application and the integrated application(s) may be installed together as a package.

With past approaches, the primary application developer would require knowledge of the integrated application's system requirements and associated validation checks. The developer was required to manually integrate the integrated application's requirements and checks into the primary application's validation module, by including the integrated application's requirements in an associated knowledge source and including the integrated application's checks in the validation test identifiers 104, mapping 106 and validation check code 108 files for the application. This type of manual integration is labor-intensive and may be prone to error, especially in view of the numerous possible states of numerous products with which the primary application is being integrated (e.g., product A runs on top of product B, which runs on top of product C) and with which the primary application should be compatible. In addition, when the integrated application changes or the integrated application's requirements change, then the primary application's validation module would require updating to reflect these changes.

In one embodiment, a modular approach to integrating an application's validation checks with other applications' validation checks, is provided via a properties file 102. The manner in which properties file 102 is implemented may vary. For example, a properties file 102 could be implemented to contain metadata for all the component resources (e.g., files, code, etc.) of a single corresponding validation module, or could be implemented to contain metadata for all the component resources (e.g., files, code, etc.) of multiple corresponding validation modules.

The capabilities of properties file 102 is extended to support configuration and management of multiple files of a given type (e.g., a type file for each integrated application), such as respective validation test identifiers 104, mapping 106, and validation check code 108 for respective applications. Properties file 102 also supports multiple instances of a given type of knowledge source (e.g., knowledge sources for each integrated application), such as respective reference host knowledge sources, application platform requirement knowledge sources, and the like. Therefore, validation engine 110 is capable of recognizing, from properties file 102, that input is coming from several sources of the same type of input.

Consequently, a primary application validation module only needs to include the primary application's input files, with references (e.g., pointers) to any integrated applications' validation input files in the properties file 102. Thus, there is one file of a given type for the primary application and one file of the given type for each integrated application, and the primary application developer is not required to rework the files to manually integrate the integrated applications' validation modules. Furthermore, integration of multiple applications' validation modules occurs at the properties file 102 level, i.e., at the metadata level, without requiring changes to the underlying input files, such as the validation check identifiers 104, mappings 106, and validation check code 108 input files. These files are pluggable into the validation system, with corresponding references and metadata in the properties file 102.

Validation engine 110 processes validation modules based on the configuration of the modules in properties file 102. In scenarios in which properties file 102 is used to include metadata about the primary application's input files and pointers to any integrated applications' files, validation engine 110 effectively generates a union of validation checks based on the order of the file references in properties file 102. In one embodiment, files that are referenced in properties file 102 before other files preempt, or override, the latter-referenced files. Hence, validation engine 110 resolves the ordering of validation checks without ambiguity, based on the corresponding ordering of file references within properties file 102. Validation engine 110 ignores duplicate validation check identifiers (e.g., duplicate validation check names that correspond to respective application validation modules) and corresponding validation check code associated with later-referenced validation files or modules.

The described functionality provides modular integration of validation checks, which results in the validation system being significantly more scalable in that numerous validation modules for different applications can readily be plugged into the validation system. Furthermore, interdependent applications which require interdependent validation checks, can be easily integrated with each other and easily integrated into the validation system, without requiring knowledge of the content of, or reworking of, an interdependent validation module.

As described, such integration is simple in that the properties file 102 is configurable to reference and to order validation module components of interdependent applications. Thus, a developer can develop validation methods for a particular application and expose those methods to the validation system and to users of the validation system via properties file 102.

Figure 1B:
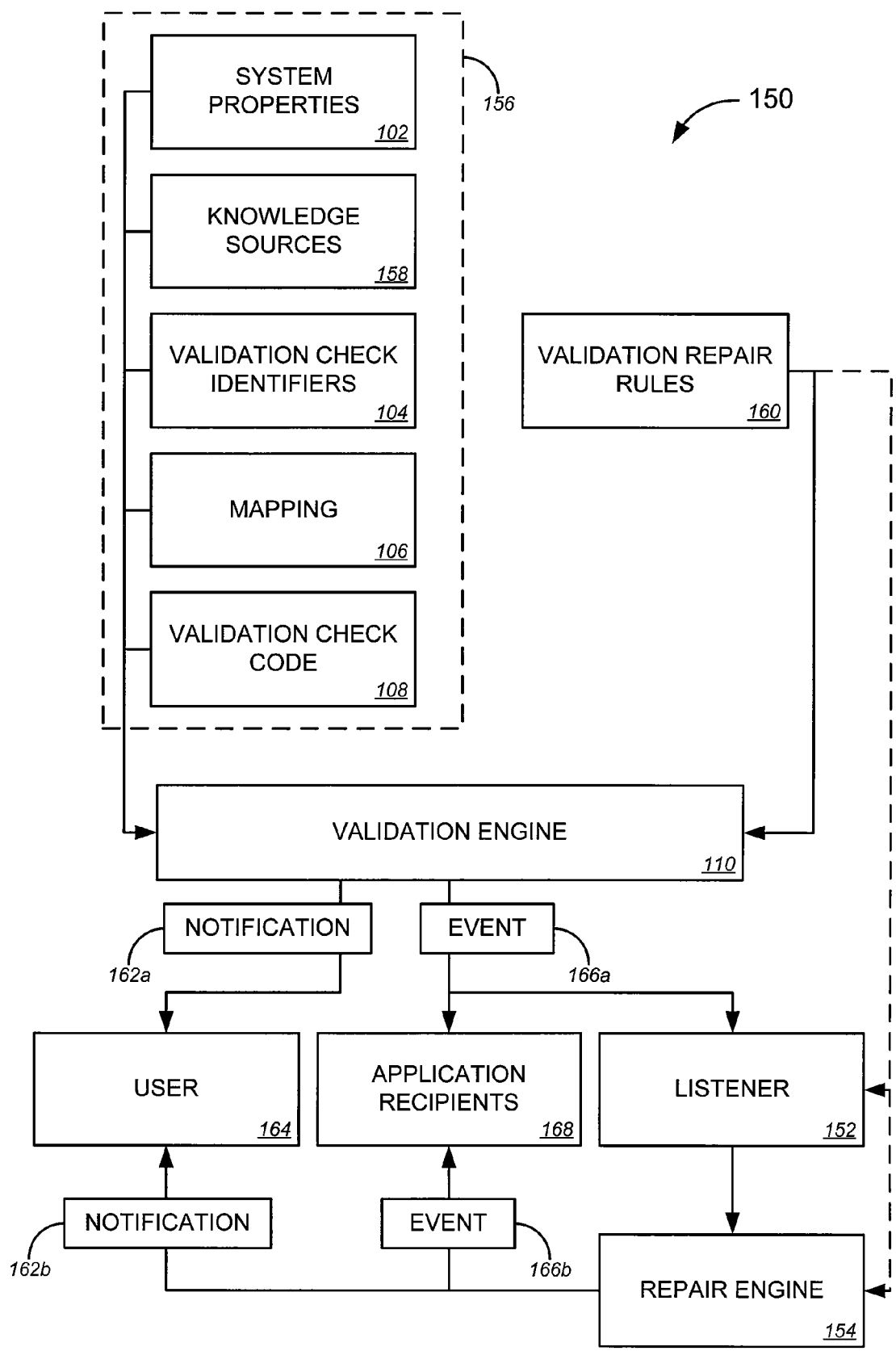
FIG. 1B is a block diagram that illustrates a validation and repair system, according to various embodiments of the invention.

FIG. 1B illustrates the functional components of a validation and repair system 150 that can be used to perform system environment validation, as well as, in some cases, repair any system environment configuration problems that are identified. The validation and repair system 150 includes a validation engine 110 (which might be, but need not be, similar to the validation engine 110 described above with respect to FIG. 1A), as well as a listener 152 and a repair engine 154.

In an aspect, the validation and repair system 150 provides a flexible tool for diagnosing and repairing system environment conditions that would prevent the proper functioning of an application and/or any other software component. Merely by way of example, in some cases, the validation and repair system may be incorporated within an installation program for an application. In other cases, the validation and repair system may be separate from any installation program and/or may be configured to perform validation and/or repair procedures for a many different applications, based on sets of validation check data and/or repair rules specific to each of the applications. As described herein, a repair and validation engine can employ a modular framework allowing each application developer to provide various validation check data and/or repair rules for that developers applications, providing a robust and extensible system that can be used for many diverse and/or unrelated applications.

Similar to the validation system 100 described above, the validation and repair system 150 takes, as inputs, a set of validation check data 156. Examples of validation check data 156 are described in detail above, and they can include, without limitation, system properties 102, validation check identifiers 104, mappings 106, validation check code 108, and knowledge sources 158 (including without limitation, properties files 102, application requirements 112, and/or system properties 114). In addition, the validation engine 110 takes, as input, one or more validation repair rules 160. (In some cases, the validation repair rules 160 can be considered part of the validation check data 156.) The validation repair rules 160 are used, as described in more detail below, to instruct the validation and repair system 150 how to repair one or more validation check failures.

In operation, after the validation engine 110 receives the validation check data 156, the validation engine 110 performs one or more validation checks, for example as described in detail herein. After performing the validation checks, the validation engine 110 may provide a notification 162a to a user 164, for example by providing output to a display, by creating a log file, by e-mailing a result to the user, and other like. Additionally and/or alternatively, the validation engine 110 may trigger an event 166a for an application recipient 168. Merely by way of example, in some embodiments, the validation engine 110 may be configured to trigger, as the event 166a a simple network management protocol ("SNMP") trap, which can be received by a standard SNMP management console. Alternatively and/or additionally, the event 166a can be provided to an application through an application program interface ("API"), through the use of extensible markup language ("XML"), and/or the like. Of particular interest with respect to the validation and repair system 150, these events 166a can provide notification that the system environment has failed one or more validation checks.

In a particular set of embodiments the listener 152 is configured to receive events 166a (and/or other output from the validation engine 110) as well. (The event 166a received by the listener 152 can take the same form and/or different form as an event received by an application recipient 168.) The listener 152 can be any program, component, process, and/or the like that is configured to monitor and/or receive notifications from the validation engine 110. Merely by way of example, in one embodiment the listener 152 is the process and/or component that is configured to receive output from the validation engine 110 and, based upon the output invoke a repair engine 154. In some cases the listener 152 is a component of the repair engine 154, while another cases, the listener 152 is separate from the repair engine 154. In a particular set of embodiments, the listener 152 may be incorporated within a general monitoring component and/or process that is configured to monitor events and/or other output from a variety of software tools and/or processes (of which the validation engine 110 might simply be one of several).

In a set of embodiments, as described in further detail below, the validation repair rules 160 are passed from the validation engine 110 to the listener 152 as part of the event. (Alternatively and/or additionally, the validation repair rules 160 can be provided directly to the listener 152 and/or the repair engine 154.) As noted above, upon detecting a validation check failure, the listener 152 invokes the repair engine The repair engine 154 evaluates a repair rule 160 that applies to the validation check failure, and executes one or more commands specified by the validation repair rule 160, to repair a system condition identified by the validation check that was failed.

Upon repairing the system condition, (or, in some cases, upon an unsuccessful repair attempt) the repair engine 154 provides notice to a user 164 and/or application recipient 168. (In an aspect, the repair engine 154 can use similar notice facilities—such as a notification 162b and/or an event 166b—to those described above to provide notice to the appropriate entities.) The operation of a validation and repair system 150 is described in further detail below with respect to FIGS. 4A and 4B.

Figure 1C:
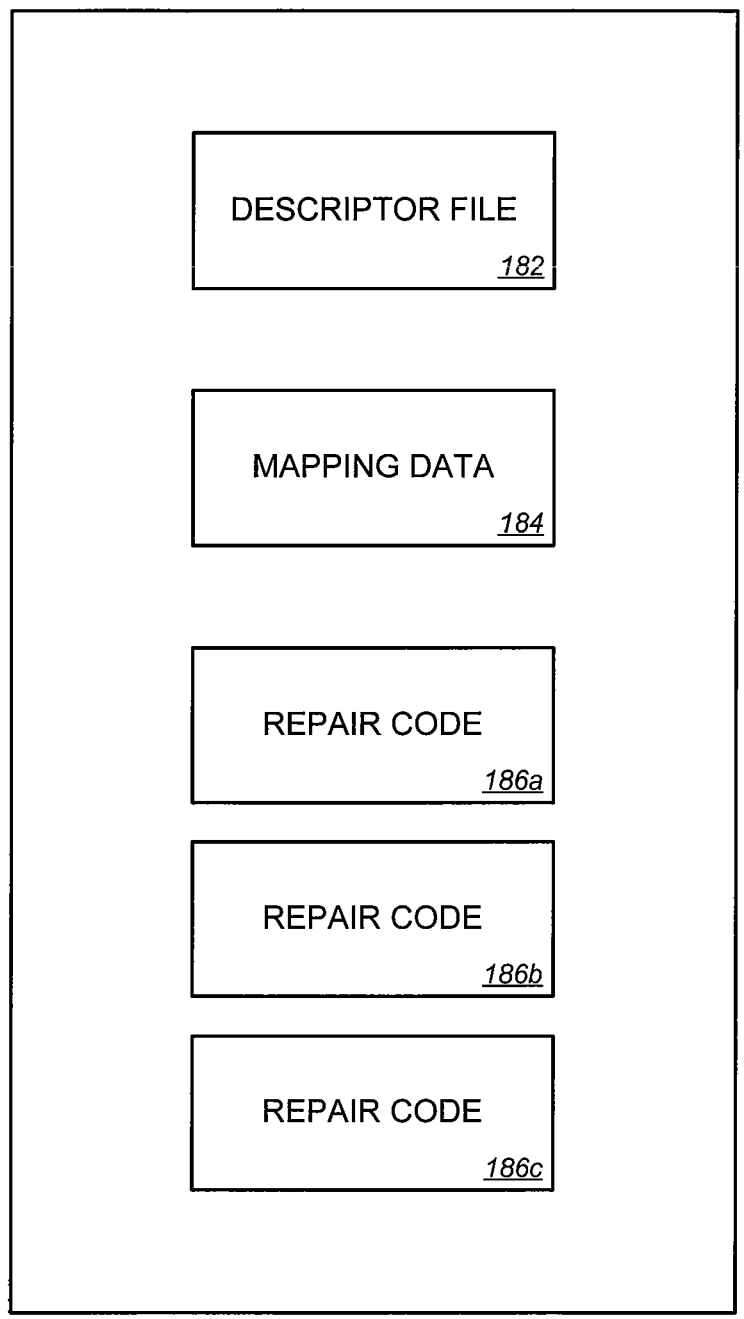
FIG. 1C is a block diagram illustrating a repair rule, according to various embodiments of the invention.

FIG. 1C illustrates the structure of a repair rule 180 in accordance with one embodiment of the invention. In one set of embodiments, the repair rule 180 is embodied by a single file. In other embodiments the repair rule 180 my comprise a plurality of files. In yet other embodiments, multiple repair rules may be incorporated within a single file.

In the illustrated embodiment, the repair rule 180 comprises a descriptor file 182 the descriptor file 182 comprises a namespace for one or more operations to be undertaken to repair a particular system condition, and/or a namespace for the system condition itself. The repair rule 180 further comprises mapping data 184 (which may or may not be a separate file), and one or more sets of repair code 186. In an aspect, the repair code 186 comprises a set of one or more executable commands and/or code that can be executed by the system to perform one or more operations to repair the system condition to which the repair rule 180 applies. A variety of executable commands are supported by various embodiments in the invention. Merely by way of example, in some cases an executable command might be an operating system command, while in other cases the executable command might be a script, such as a Perl script, a shell script, and/or the like. In yet other cases, the executable command may be a function, method, etc. written in a compiled and/or interpreted programming language such as C, C++, Java, and/or the like.

In a set of embodiments, there are a plurality of sets of repair code 186*a-c* to accommodate various system environments in which a validation in repair system may be run. Nearly by way of example, a first set of repair code 186*a* might comprise commands appropriate to repair the system condition and in an UNIX environment, while a second set of repair code 186*b* might comprise commands appropriate to repair the system condition in a Windows environment, while a third set of repair code 186 might comprise commands appropriate to repair the system condition in an environment operating one or more Linux distributions.

The mapping file 184 is used to map the namespace from the descriptor file 182 to one of the sets of repair code 186. Hence, in a set of embodiments, the descriptor file 182 and the repair code 186 can be generalized, and the mapping file 184 can be used to customize the repair rule for the particular system environment in which it runs. In some cases, the mapping file 184 might be customized for the system environment. In other cases, the system environment can be discovered programmatically (e.g., through any of several tools commonly known in the art) and provided as input to the validation and repair system in order to allow selection of a particular mapping in the mapping file that applies to the instant system environment.

In some embodiments, a repair rule (and/or components thereof) may be included with other validation check data, while another embodiments the repair rules are separate from the validation check data. Merely by way of example, and an descriptor file 182, may be included with a set of validation check identifiers (as described above), the repair code 186 may be included with the validation check code 108, and/or the mapping file 184 may be included with the mapping 106 described with respect to FIG. 1A.

Figure 2:
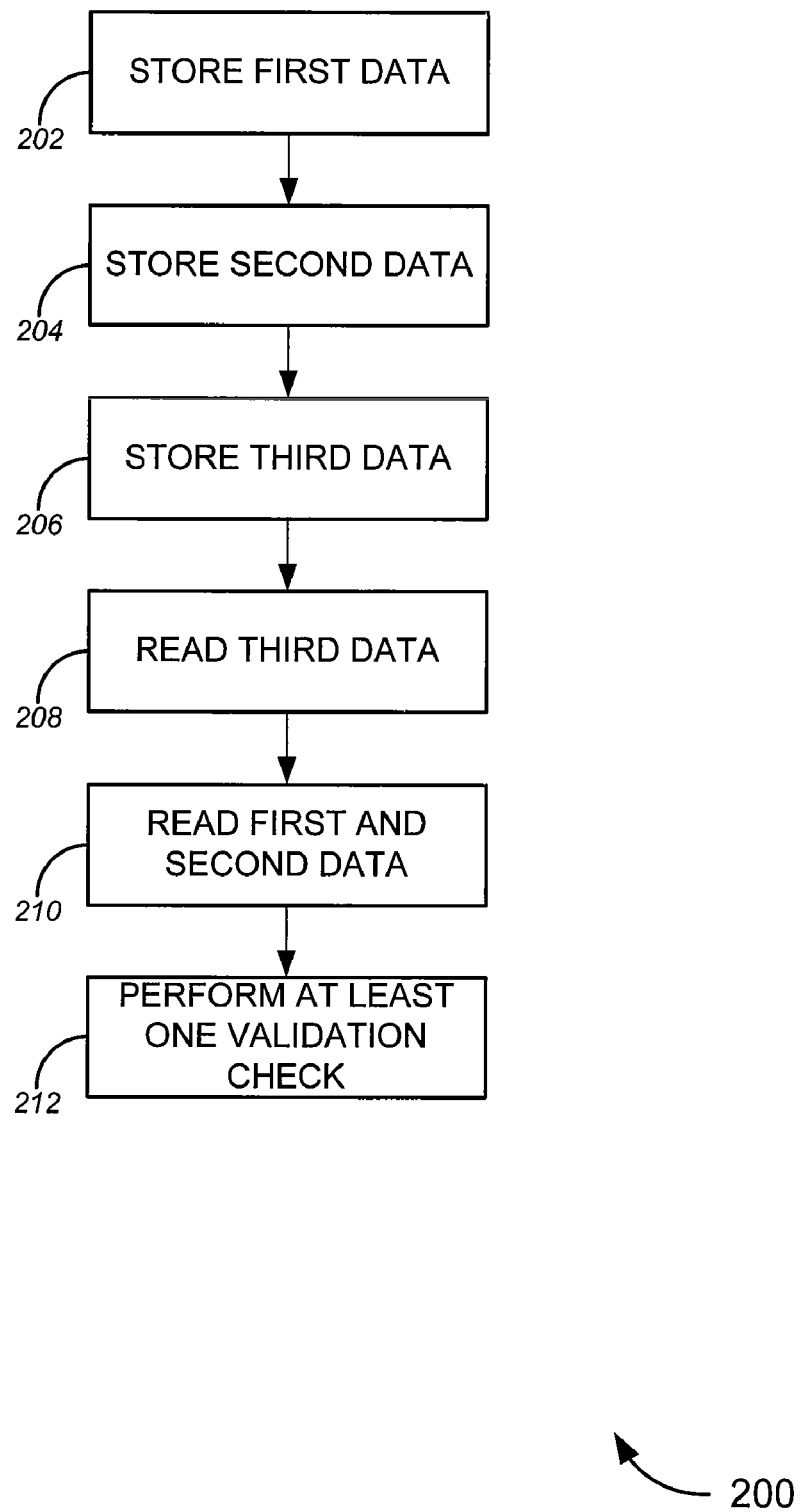
FIG. 2 is a flow diagram that illustrates a process for validating a system environment for an application, according to various embodiments of the invention.

FIG. 2 is a flow diagram that illustrates a process for validating a system environment for an application, according to an embodiment of the invention. In one embodiment, the process of FIG. 2 is performed by executing one or more sequences of instructions that cause one or more processors to perform the described actions, such as the processor(s) 510 of the computer system 500 described with respect to FIG. 5, below.

At block 202, first data is stored. The first data identifies first validation checks for validating a system environment for a first application, which uses a second application. At block 204, second data is stored. The second data identifies second validation checks for validating a system environment for a second application. For a non-limiting example, validation check identifiers 104 (FIG. 1A) are stored in computer system memory in association with a corresponding application server and validation check identifiers 104 are stored in association with a corresponding database server that the application server uses for executing database operations on data in a database. The example of the integration of an application server with a database server is continued herein for purposes of an example only, and in no way limits the context in which the techniques described herein may be implemented. Furthermore, not all embodiments of the invention are necessarily in the context of validating system properties against multiple applications' requirements.

At block 206, third data is stored. The third data indicates that the first application uses the second application. For example, properties file 102 (FIG. 1A) is stored in computer system memory in association with a corresponding application, such as the application server of the ongoing example. In the properties file 102 are metadata about the corresponding data files, etc., as well as the pointers (or other similarly functioning referencing mechanism) to the data files, etc. for the integrated application(s).

At block 208, the third data is read in response to a request to perform an operation that involves the first application. The third data is read in order to determine that the validation checks for the first and second application need to be performed. For example, the properties file 102 for the application server is read and interpreted by validation engine 110 (FIG. 1A) to determine that both the application server's and the database server's validation checks need to be executed. Validation engine determines that the database server's validation checks need to be executed based on the pointer to the database server's validation module components.

After determining that the validation checks for the first and second applications need to be performed in order to validate the system properties in view of the applications' requirements, at block 210, the first and second data are read to determine which specific validation checks need to be performed. For example, validation engine 110 reads the validation check identifiers 104 for each of the application server and database server, identifies validation checks for each server, and uses the corresponding mappings 106 (FIG. 1A) to identify corresponding validation check code 108 (FIG. 1A).

At block 212, at least one of the validation checks, from the first and second validation checks, is performed to validate that the applications' requirements are met by the system. For example, validation engine 110 executes appropriate validation check code 108, in conjunction with input from application requirements 112 (FIG. 1A) and system properties 114 (i.e., relevant knowledge sources) as described in U.S. patent application Ser. No. 10/901,831.

Conditional Logic for Validation Checks

Some validation checks benefit from condition evaluation and satisfaction logic. For example, a set of validation checks for a given application may include a validation check that compares operating system package versions (i.e., the functionality or components of different versions) because errors or bugs in the application were found when the application executes on top of a particular version of an OS. A corresponding validation check may be directed to check for complicated ranges of system properties. For example, the application whose system requirements are being validated may require a version of an OS greater than version 10.2.1 and less than version 10.5, excluding version 10.4.9 (an interim version between the upper and lower version boundaries). With past approaches, implementation of complicated system requirement ranges would require hard-coded coding of the validation check code 108 in order to support range-based conditions. Maintaining hard-coded requirement ranges in the validation code itself is not an ideal approach.

Some validation checks require the results of one check in order to drive another check. For example, one validation check may check for available total memory. Based on the results of that validation check, performance of one of several other validation checks is required. For example, such logic may include the following: if available memory is between X and Y (based on a validation check a), then run validation check b, otherwise run validation check c. For another example, such logic may include the following: if available memory is between X and Y (based on a validation check a), then run validation check b with parameter m; if available memory is between Y and Z (based on a validation check a), then run validation check b with parameter n; and so on.

In one embodiment, conditional logic is introduced into a knowledge source so that similar logic does not need to be in the validation test code. For example, application requirements 112 may contain conditional logic so that similar logic is not required in validation test code 108. Consequently, the knowledge source is dynamic in nature and can be used to direct the validation engine 110 as to which validation checks to execute, or what parameters to input to a particular validation check. A non-limiting example of a use of this feature is in the context of post-production (i.e., after release of an application product) exceptions, when an incompatibility is discovered between an OS and application installed on top of the OS. Rather than requiring validation code changes, one can simply provide a customer a new knowledge source (e.g., an XML file) of application requirements 112 with the exceptions built into conditional logic within the knowledge source, or inform the customer to modify the existing knowledge source to account for the exceptions.

With past approaches having a static reference model (i.e., no conditional logic on top of the validation check code), a change in a validation check algorithm and/or validation check parameters required (a) change to the validation check source code (i.e., validation check code 108); (b) building of binaries; and (c) shipping the binaries to the user. As mentioned, with the new technique described herein, such changes can be implemented simply by modifying a knowledge source, such as an input XML file, and providing the modified knowledge source to the user. This technique simplifies and significantly enhances the turnaround time for fixing issues with the application or its validation module in a post-production context. In addition, a data file change is less prone to error than modified validation code.

Mode Support for Validation Checks

Different modes of operation, with respect to the application operation being performed in conjunction with the validation, may expose different application functionalities and, therefore, require different subsets of validation checks based on the mode. For example, different validation checks may be required depending on the system environment in which the application operation is performed, such as when installing an application on a stand-alone machine as opposed to installing the application on a cluster of machines. Further, different validation checks are typically required depending on what kind of application operation is performed, such as whether the application is being installed, updated, languages added, etc. Therefore, a validation system that readily supports multi-mode validation checks is beneficial.

In one embodiment, the validation test identifiers 104 file is extended to support multiple modes of operation. Consequently, different rule sets (comprising a set of validation checks and associated validation check code) can be developed for different modes, integrated, and exposed in the validation check identifiers 104 file. That is, in a validation check identifiers 104 file for a given application, one rule set comprising a subset of validation checks can be associated with one mode of operation, and another rule set comprising a different subset of validation checks can be associated with a different mode of operation. Likewise, mapping 106 maps the validation check identifiers 104 for a given rule set to the corresponding validation check code 108 which, when executed, performs the corresponding validation checks of the system environment that need to be performed for the associated mode of operation.

Because the validation check identifiers 104 files are the processing entry points to the actual validation checks performed by validation engine 110, the validation check identifiers are used to dictate which validation checks to perform for a given mode of operation. Thus, depending on what product, what type of operation (e.g., install versus update), and what type of system environment (e.g., stand-alone versus cluster) a user selects, validation engine 110 can determine what is the appropriate subset of validation checks to invoke, based on information in the appropriate validation test identifiers 104 input.

In one embodiment, a default chain of subsets of validation checks can be implemented using the properties file 102. For example, a generalized order of different subsets of validation checks can be specified in the properties file 102, from which validation engine 110 can traverse the chain in order to identify and locate the appropriate validation checks to execute for a given application and mode. Thus, if a dominant (i.e., higher in the order of priority) subset of validation checks specified in the chain in the properties file 102 for a particular mode is not found in the corresponding validation check identifiers 104, then validation engine 110 can move to the next available subset in the chain and process that subset of validation checks.

A Process for Validating a System Environment

Figure 3:
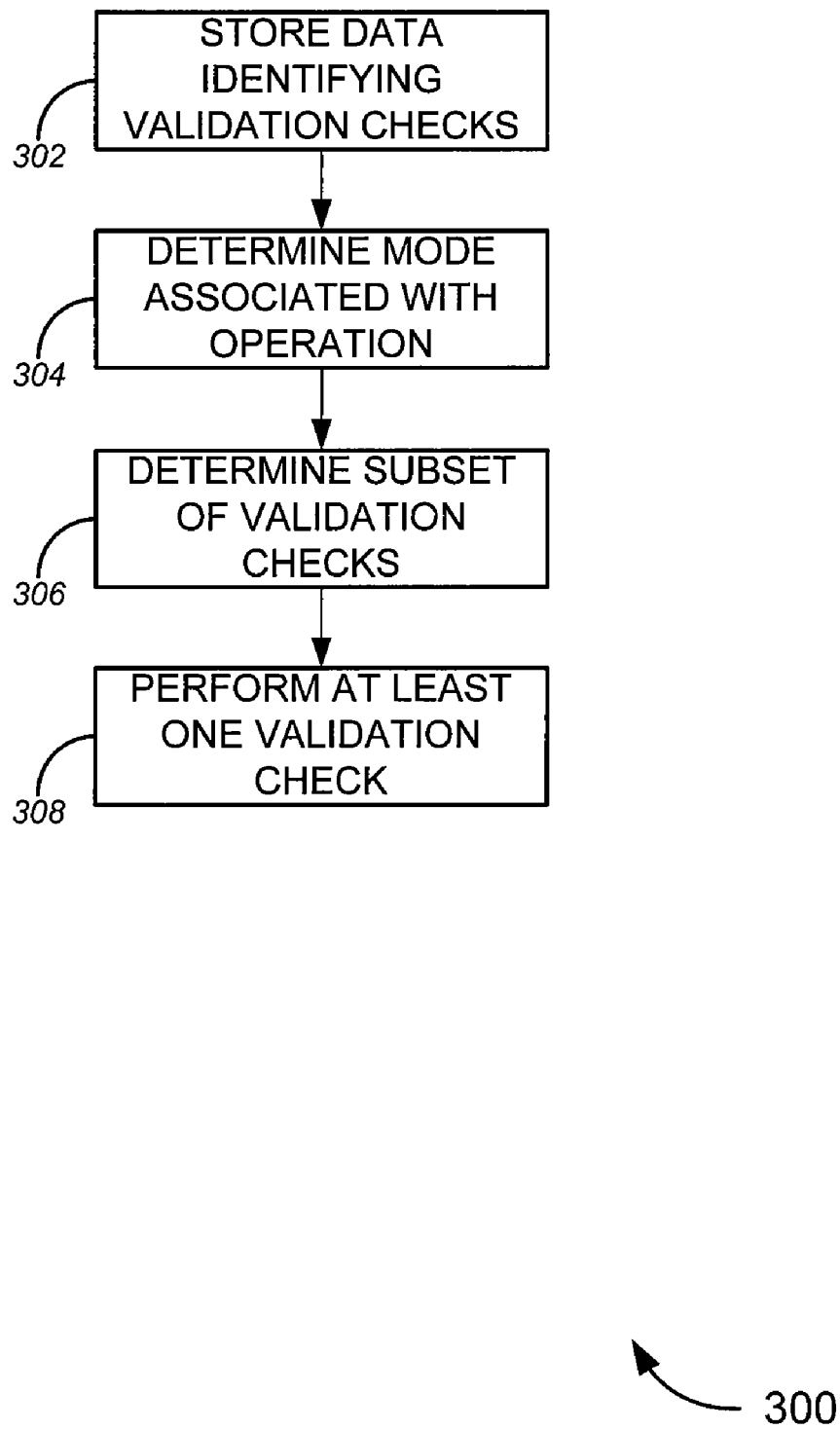
FIG. 3 is a flow diagram that illustrates a process for validating a system environment for an application, according to various embodiments of the invention.

FIG. 3 is a flow diagram that illustrates a process for validating a system environment for an application, according to an embodiment of the invention. In one embodiment, the process of FIG. 3 is performed by executing one or more sequences of instructions that cause one or more processors to perform the described actions, such as the processor(s) 510 of the computer system 500 of FIG. 5.

At block 302, data is stored in association with an application. The data identifies validation checks for validating a system environment for the application. For a non-limiting example, validation check identifiers 104 (FIG. 1A) are stored in computer system memory in association with a corresponding application server. The data associates each mode of a plurality of modes with a set of validation checks, or with a set of rules that identify or reference corresponding validation checks. For example, a particular set of checks are mapped, in validation check identifiers 104 (FIG. 1A), to corresponding modes. Generally, the sets of validation checks are not necessarily mutually exclusive because different sets may contain one or more common validation checks.

The term "mode" is used here in a general context. In one embodiment, a mode corresponds to the system environment in which the application will execute, such as whether the application operation is performed on an application that will execute on a stand-alone machine or on multiple machines that function together, such as in a cluster and/or grid environment. In another embodiment, a mode corresponds to the type of operation being performed on the application, for non-limiting examples, an install operation, update operation, adding languages, and the like.

At block 304, the particular mode that is associated with an operation that involves the application is determined in response to a request to perform the operation. For example, in response to a request to install the application server on a clustered node, validation engine 110 (FIG. 1A) determines, from the request, that the requested operation is a cluster-based install operation.

At block 306, the particular subset of validation checks that are associated with the mode is determined based on the data. For example, validation engine 110 reads validation check identifiers 104 (FIG. 1A) and, based on the requested mode, determines the particular subset of validation checks that need to be performed in association with a cluster-based install operation for the application server.

At block 308, at least one of the validation checks in the particular subset of validation checks is performed to validate that the applications' requirements are met by the system. For example, validation engine 110 executes appropriate validation check code 108 FIG. 1A), in conjunction with input from application requirements 112 (FIG. 1A) and system properties 114 (i.e., relevant knowledge sources) as described in U.S. patent application Ser. No. 10/901,831.

Figure 4A:
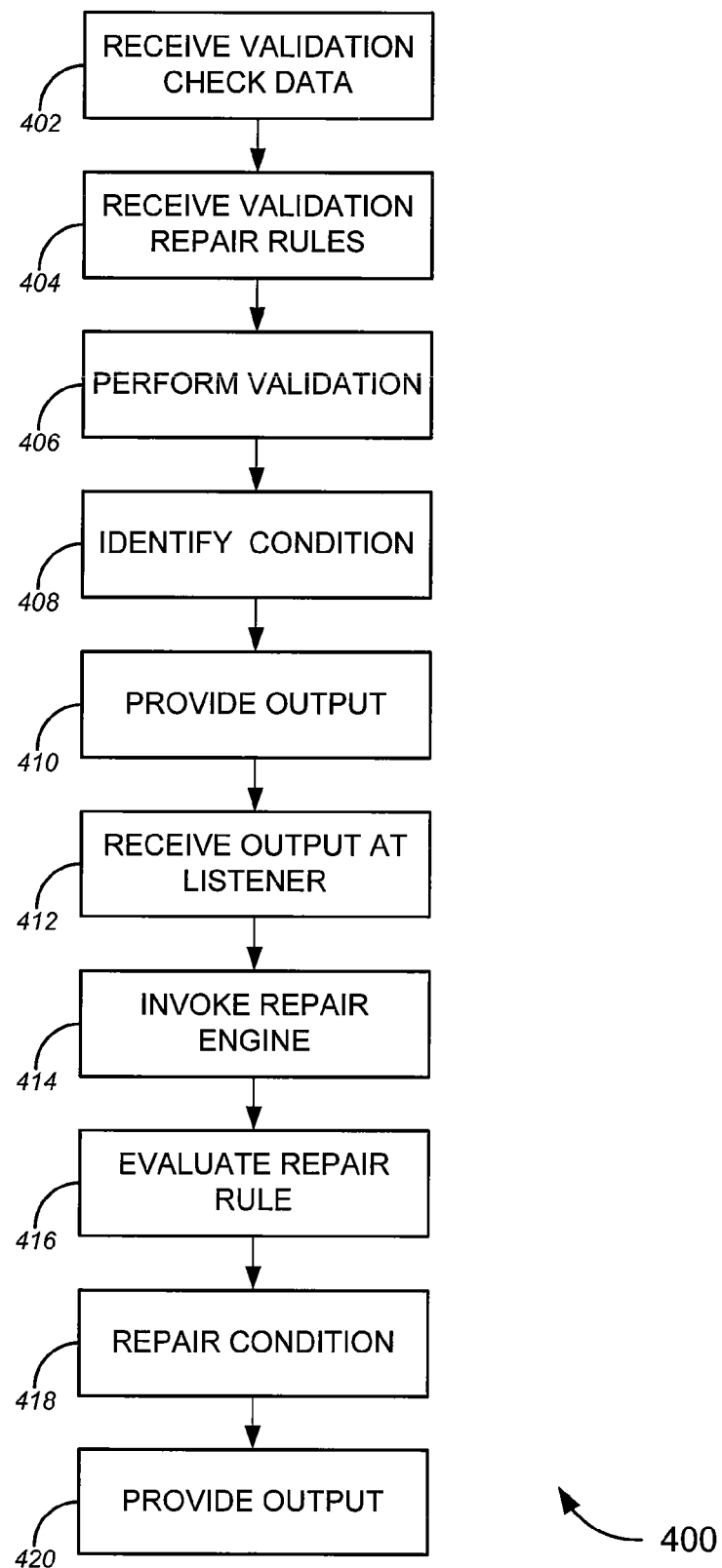
FIG. 4A is a flow diagram that illustrates a method of validating a system environment for an application and repairing a validation failure, in accordance with various embodiments of the invention.

As noted above, certain embodiments, in addition (or as an alternative) to validating a system environment, can repair certain conditions that might have been identified in a validation check (or otherwise). Merely by way of example, FIG. 4A illustrates a method 400 for validating a system environment and repairing a condition identified during the validation process. For illustrative purposes, the method 400 of FIG. 4A (as well as the method illustrated by FIG. 4B) is described with respect to the system 150 of FIG. 1B, although those skilled in the art will appreciate, based on the disclosure herein, that the system 150 can be to configured to perform methods other than those described with respect to FIGS. 4A and 4B; similarly the methods 400 and 450 are not limited to implementation on the system 150 of FIG. 1B but instead can be performed using any suitable hardware and/or software architecture.

The method 400 comprises receiving, at a validation engine, a set of validation check data (block 402). As noted above, validation check data can include, without limitation, system properties, knowledge sources, validation check identifiers, validation mapping data, validation check code and/or the like. This validation check data can be received, merely by way of example, from input files, from a user via an input device and/or the like. In an aspect, a set of validation check data is used (as noted above) for validating a system environment, e.g., for one or more applications. Hence, the validation check data may comprise information about one or more requirements for proper functioning of the application(s) (such, merely by way of example, required dependencies, operating system settings, hardware requirements, etc.).

The method 400 further comprises receiving a set of one or more validation repair rules (block 404). In some cases, the validation repair rules can be received with the validation check data (in particular cases, as noted above, the validation repair rules may be incorporated with the validation check data). In other cases, the validation repair rules can be received separately from the validation check data (although, in an aspect, the validation repair rules may be received in similar fashion to the validation check data). Merely by way of example, the validation repair rules may be received at a listener and/or a repair engine, while the validation check data may be received at a validation engine. It should be noted, however, that in some embodiments, the validation check data may also be received at the validation engine.

At block 406, one or more validation checks (as defined by the received set of validation check data) are performed, e.g., by the validation engine. The validation check(s) pertain to at least one of the requirements specified by the validation check data. In other words, the validation check(s) ensure that the requirements are met. FIGS. 1A, 1B, 2 and 3, above, as well as the Related Applications, describe various systems and procedures for performing validations, and any of these systems and/or procedures, as well as others, may be used to perform validation checks in accordance with embodiments of the invention.

As noted above, a validation check is often used to validate the system environment for one or more applications (e.g., prior to and/or during installation and/or upgrade of one or more of those applications). In an exemplary case, the validation check identifies a system environment condition there needs to be repaired for proper functioning of the application(s) (block 408). Based on the disclosure herein, one of skill in the art will appreciate that a variety of system environment conditions and/or repaired by embodiments of the invention.

Merely by way of example, in some cases, there may be a missing dependency for an application. (As used herein, the term "dependency" means any software application, library, program, component, and/or the like that is considered a prerequisite and/or a co-requisite to the installation of a target component—that is, a component, such as an application, etc., that is being installed, upgraded or the like and/or that necessitates a validation check—and/or is necessary for the proper functioning of the target component.)

Other examples of system environment conditions that might prevent the proper functioning of an application or component include, without limitation, dependencies with incorrect versions, misconfigured dependencies, and/or the like. In some cases, operating system misconfigurations can present system environment conditions that would prevent the proper functioning of an application. Such misconfigurations can include improper file system configurations (such as unavailable and/or unmounted drives), improperly configured memory settings (e.g., insufficient and/or excessive swap file size, insufficient memory allocation, and/or the like), uninstalled and or improperly installed operating system components (although such a misconfiguration might instead be considered a dependency misconfiguration), etc. In an aspect, a system environment condition that prevents the proper functioning of an application or component represents a requirement of that application and/or component that has not been met.

At block 410, the validation engine provides output regarding the status of the validation checks. As noted above, output from a validation engine can take a variety of forms, including, without limitation, a user notification and/or an event, such as those described in detail above. In a particular set of embodiments, for example, the validation engine might provide output from a validation check by triggering an event, which can be received by a variety of different recipients. An exemplary recipient might be, as noted above, an SNMP management console. Another exemplary recipient of output from the validation engine (such as an event triggered by the validation engine, a message transmitted by the validation engine, and/or the like) is a listener.

In some cases, the output from the validation engine will comprise information about the system environment condition(s) that have been identified in the validation check. Merely by way of example, such information might comprise an identification of the validation check that was failed, an identification of the system environment condition that was identified by the validation engine, and/or an identification of one or more repair rules that should be used to repair the identified system environment condition. In a particular set of embodiments, the output from the validation engine comprises one or more repair rules that are to be used to repair the identified system environment condition (such as, for example, in implementations in which the repair rule is originally received by the validation engine, rather than the listener and/or the repair engine).

At block 412, the output from the validation engine is received at a listener. Depending on the embodiment, receiving output from the validation engine can comprise a variety of processes. Merely by way of example, in some cases, the validation engine may be configured to transmit the output to the listener. The listener, which may be an idle process (such as a daemon and or the like) then might become active upon receiving the output from the validation engine. In other embodiments, the listener may be an active program that continuously and/or periodically polls the validation engine to determine whether the validation engine has produced any output.

Based, in some cases, on receiving the output from the validation engine, the listener invokes a repair engine (block 414). In a set of embodiments, when invoking the repair engine, the listener will provide to the repair engine some or all of the information it received from the validation engine about the identified system condition. Merely by way of example, if the listener received, as part of the output, a repair rule to be used, that repair rule might be provided the repair engine when it is invoked. In an alternative embodiment, if the listener receives an identification of the repair rule from the validation engine, the listener might be configured to obtain the identified repair rule (e.g., from a data store, such as a database, file system, etc.) and provide the repair rule to the repair engine when it is invoked. In other embodiments, the listener might receive an identification of a repair rule and provide that identification to the repair engine which then might obtain the repair rule itself.

In yet further embodiments, the listener receives, as part of the output from the validation engine, merely an identification of the validation check(s) that were failed and/or the system environment conditions that were identified as causing the failure(s). In such embodiments, the listener may be configured to identify (e.g., based on the identified system condition and/or validation check) an appropriate repair rule. This repair rule (and/or an identification thereof) can then be provided to the repair engine. Alternatively and/or additionally, the repair engine itself may be configured to identify and/or obtain the appropriate repair rule (e.g., from a data store, as noted above), and the listener thus might be configured merely to provide the identification of the validation check(s) that were failed and/or the system environment condition(s) that were identified.

In any event, the repair engine evaluates the appropriate repair rule for the identified system condition (block 416). Evaluating a repair rule may comprise any set of procedures in which the repair engine determines, based at least in part on the repair rule, a set of one or more operations to perform to repair the identified system condition(s). Merely by way of example, FIG. 4B illustrates one method for evaluating a repair rule in accordance with certain embodiments of the invention, although other procedures may be used to evaluate a repair rule in accordance with other embodiments.

Figure 4B:
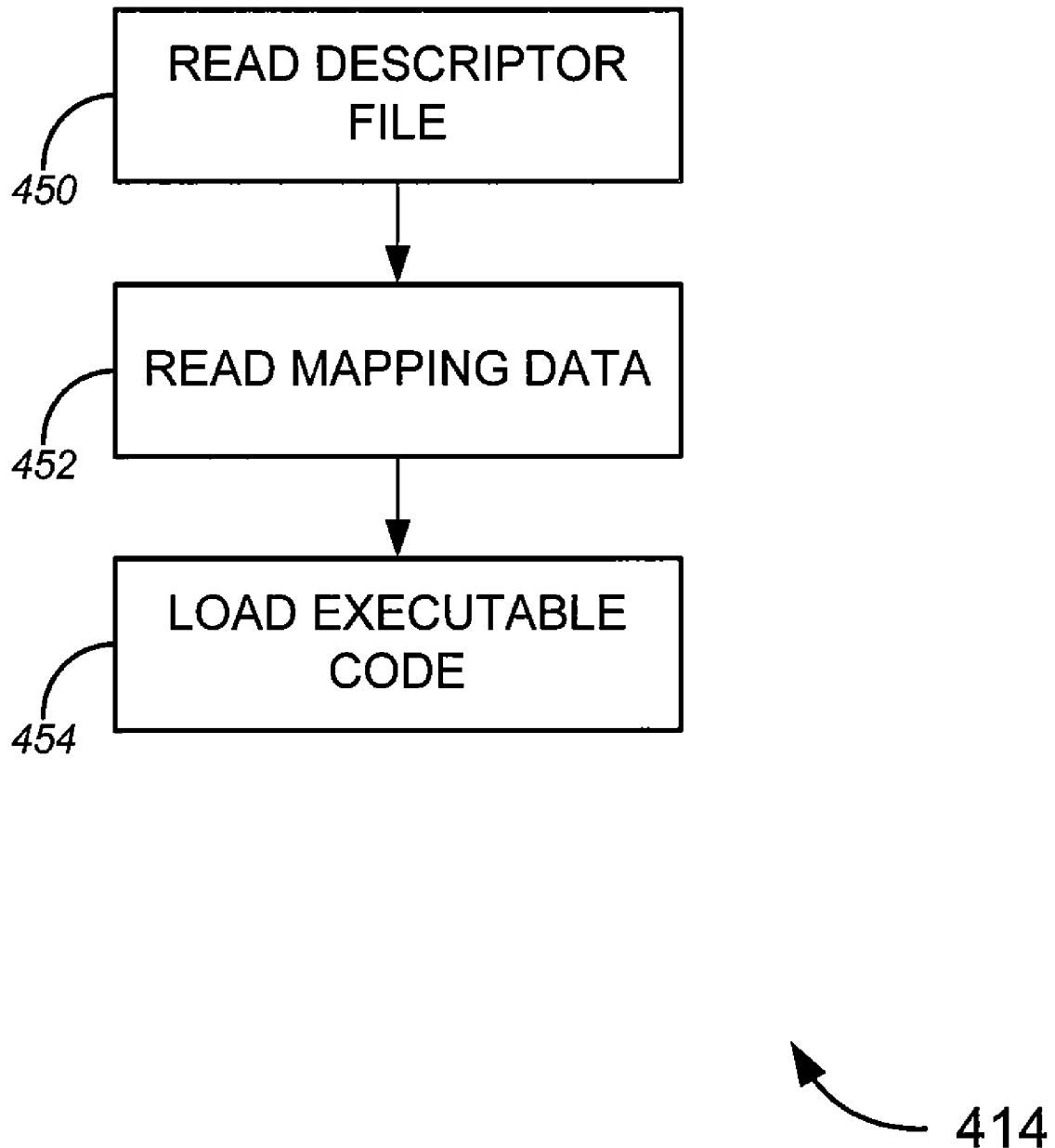
FIG. 4B is a flow diagram that illustrates a process of evaluating a repair rule, in accordance with various embodiments of the invention.

The method of FIG. 4B comprises reading a descriptor file (block 450) to identify a namespace for the necessary repair. In some cases, this namespace corresponds to an identifier for the repair rule. Merely by way of example, as noted above, the validation engine, listener, and/or repair engine may be configured to identify a repair rule, and in some embodiments the namespace can be used for this purpose. For instance, a set of validation check data for a particular validation check might specify the namespace of a repair rule to be used to repair a system environment condition that would cause the validation check to fail. In an aspect, the namespace provides a generalized way to refer to a set of repair code (or a plurality of sets of repair code) that can be used to repair one or more particular system environment conditions.

Also as noted above, mapping data is used to translate between the generalized namespace and the specific set of repair code for a particular system environment. Accordingly, mapping data is read (block 452) to determine which set of repair code (of the plurality of sets) should be executed to repair the condition, based for example, on the specific environment (e.g., operating system, etc.) in which the validation and repair system is running. Based on this identification, the appropriate set of executable code is loaded (block 454). The term "loaded" is used herein in a broad sense, to indicate merely that the executable code is identified, and that the repair engine is prepared to execute that code.

Returning to FIG. 4A, the repair engine then performs one or more operations to repair the identified system environment condition (block 418), so that that application (or other target component) can be installed, upgraded, etc. and run properly. In one set of embodiments, to perform these operations, the repair engine executes, calls and/or otherwise causes to be performed the set of repair code (e.g., the executable commands and/or code identified in the evaluation of the repair rule). In accordance with an embodiment of the invention, this repair code, when executed, repairs the system environment condition(s) identified during validation check(s).

In some embodiments, output of the repair status is provided (block 420). Merely by way of example, the validation and repair system may be configured to provide output to a user and/or another entity, such as an application recipient. This output, in some embodiments, comprises information about any repair rules that were applied during the repair process and/or a result of many operations that were performed pursuant to the repair rules. Information about the repair rules may comprise, for example, identification of the repair rules, a copy of the repair rule itself, identification of any commands performed pursuant to the repair rules, and/or the like.

Such output can take various forms. Merely by way of example, in some cases a repair engine event may be triggered and/or a user notification can be generated. A repair engine event may be received by any appropriate application recipient, such as an SNMP management console, a system log, and/or the like. A user notification can be provided to one or more users (e.g., via electronic mail, instant message, console output, and/or the like).

The method 400 can be repeated as appropriate for any number of applications and/or components that require validation of the system environment.

Figure 5:
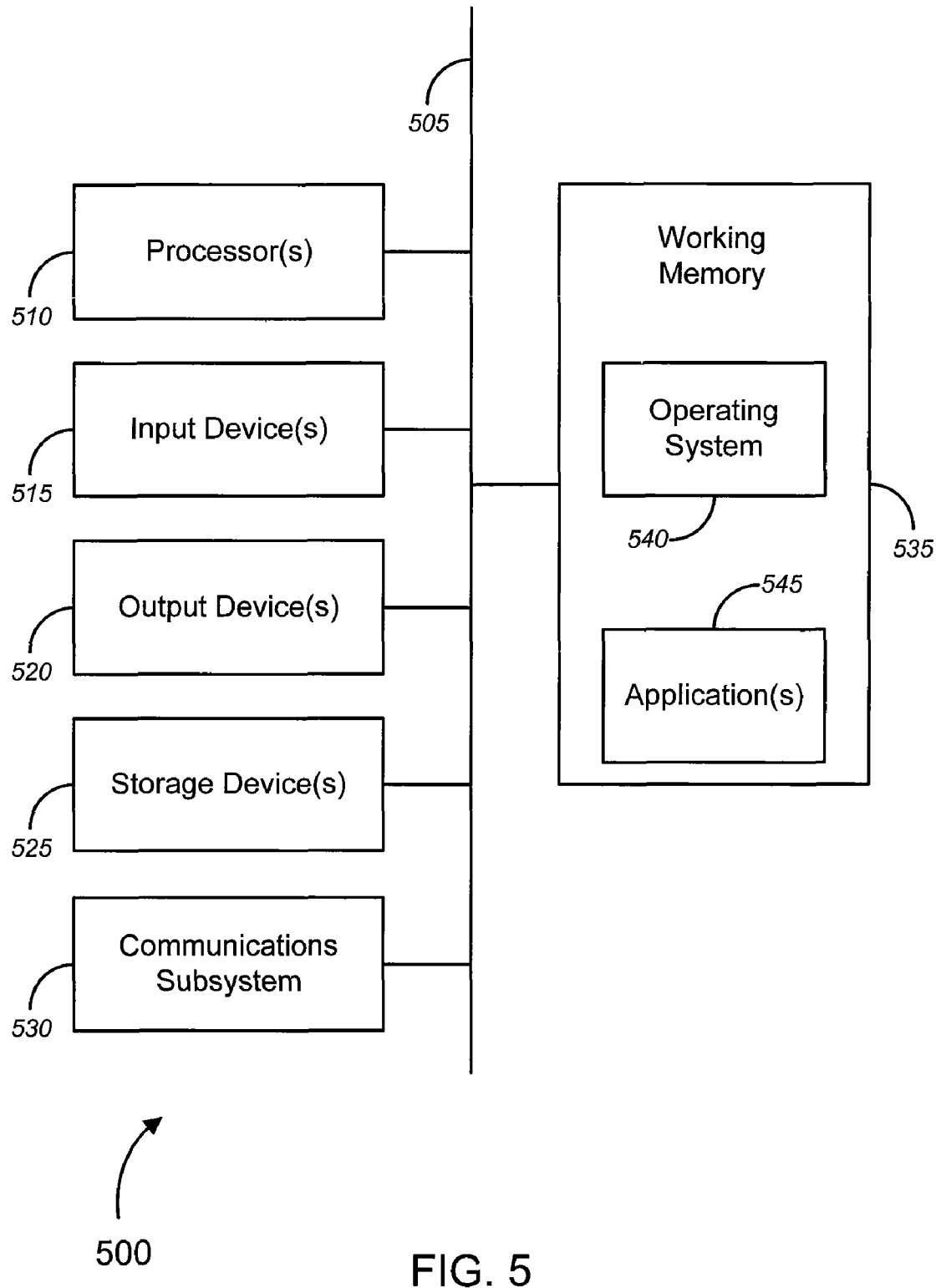
FIG. 5 is a generalized schematic diagram illustrating a computer system that can be used in accordance with embodiments of the invention.

FIG. 5 provides a schematic illustration of one embodiment of a computer system 500 that can perform the methods of the invention, as described herein. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can electrically coupled via a bus 505 (or may otherwise be in communication, as appropriate). The hardware elements can include one or more processors 510, including without limitation one or more general-purpose processors and/or one or more special-purpose processors (such as digital signal processing chips, graphics acceleration chips, and/or the like); one or more input devices 515, which can include without limitation a mouse, a keyboard and/or the like; and one or more output devices 520, which can include without limitation a display device, a printer and/or the like.

The computer system 500 may further include (and/or be in communication with) one or more storage devices 525, which can comprise, without limitation, local and/or network accessible storage and/or can include, without limitation, a disk drive, a drive array, an optical storage device, solid-state storage device such as a random access memory ("RAM") and/or a read-only memory ("ROM"), which can be programmable, flash-updateable and/or the like. The computer system 500 might also include a communications subsystem 530; which can include without limitation a modem, a network card (wireless or wired), an infra-red communication device, and/or the like), a wireless communication device and/or chipset (such as a Bluetooth™ device, an 802.11 device, a WiFi device, a WiMax device, cellular communication facilities, etc.). The communications system 530 may permit data to be exchanged with a network (such as the network 610 described below, and/or any other devices described herein. In many embodiments, the computer system 500 will further comprise a memory 535, which can include a RAM or ROM device, as described above.

The computer system 500 also can comprise software elements, shown as being currently located within the working memory 535, including an operating system 540 and/or other code 545, such as one or more application programs, which may comprise computer programs of the invention and/or may be designed to implement methods of the invention, as described herein. Merely by way of example, one or more procedures described with respect to the method(s) discussed above might be implemented as instructions executable by a computer (and/or a processor within a computer). A set of these instructions might be stored on a computer-readable storage medium, such as the storage device(s) 525 described above. In some cases, the storage medium might be incorporated within a computer system. In other embodiments, the storage medium might be separate from a computer system (i.e., a removable medium, such as a compact disc, etc.), such that the storage medium can be used to program a generic computer with the instructions stored thereon.

It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

In one aspect, the invention employs a computer system (such as the computer system 500) to perform methods of the invention. According to a set of embodiments embodiment, some or all of the procedures of such methods are performed by the computer system 500 in response to the processor(s) 510 executing one or more sequences of one or more instructions (which might be incorporated into the operating system 540 and/or other code 545) contained in the working memory 535. Such instructions may be read into the working memory 535 from another machine-readable medium, such as the storage device(s) 525. Merely by way of example, execution of the sequences of instructions contained in the working memory 535 causes the processor(s) 510 to perform one or more procedures of the methods described herein.

The term "machine-readable medium" as used herein refers to any medium that participates in providing data that causes a machine to operation in a specific fashion. In an embodiment implemented using the computer system 500, various machine-readable media might be involved in providing instructions to the processor(s) 510 for execution. In many implementations, a machine-readable medium is a physical and/or tangible medium. Such a medium may take many forms, including but not limited to, non-volatile media, volatile media, and transmission media. Non-volatile media includes, for example, optical or magnetic disks, such as the storage device(s) 525. Volatile media includes, without limitation dynamic memory, such as the working memory 535. Transmission media includes coaxial cables, copper wire and fiber optics, including the wires that comprise the bus 505, as well as the various components of the communication subsystem 530 (and/or the media by which the communications subsystem 530 provides communication with other devices). Hence, transmission media can also take the form of waves, including without limitation radio, acoustic and/or light waves, such as those generated during radio-wave and infrared data communications.

Common forms of physical and/or tangible machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to the processor(s) 510 for execution. Merely by way of example, the instructions may initially be carried on a magnetic disk and/or optical disc of a remote computer. The remote computer might load the instructions into its dynamic memory and send the instructions as signals over a transmission medium. These signals, which might be in the form of electromagnetic signals, acoustic signals, optical signals and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
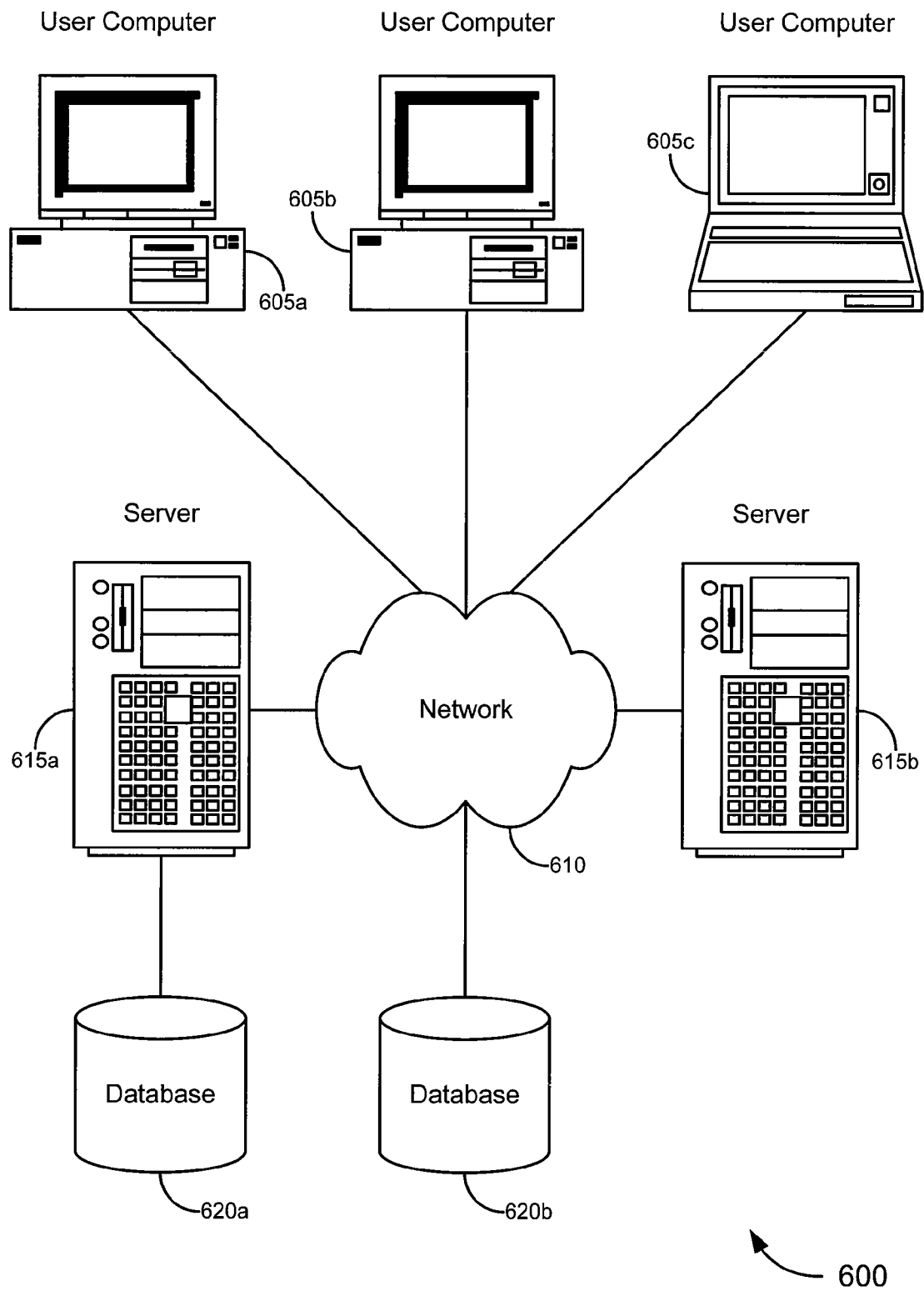
FIG. 6 is a generalized block diagram illustrating a networked system of computers that can be used in accordance with various embodiments of the invention.

A set of embodiments comprises networked systems for performing validation and/or repair operations described herein. Merely by way of example, FIG. 6 illustrates a schematic diagram of a system 600 that can be used in accordance with one set of embodiments. The system 600 can include one or more user computers 605. The user computers 605 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 605 can also have any of a variety of applications, including one or more applications configured to perform methods of the invention, as well as one or more office applications, database client and/or server applications, and web browser applications. Alternatively, the user computers 605 can be any other electronic device, such as a thin-client computer, Internet-enabled mobile telephone, and/or personal digital assistant, capable of communicating via a network (e.g., the network 610 described below) and/or displaying and navigating web pages or other types of electronic documents. Although the exemplary system 600 is shown with three user computers, any number of user computers can be supported.

Certain embodiments of the invention operate in a networked environment, which can include a network 610. The network 610 can be any type of network familiar to those skilled in the art that can support data communications using any of a variety of commercially-available protocols, including without limitation TCP/IP, SNA, IPX, AppleTalk, and the like. Merely by way of example, the network 610 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 615. Each of the server computers 615 may be configured with an operating system including without limitation any of those discussed above, as well as any commercially-available server operating systems. Each of the servers 615 may also be running one or more applications, which can be configured to provide services to one or more clients 605 and/or other servers 615.

Merely by way of example, one of the servers 615 may be a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more file and/or application servers, which can include one or more applications accessible by a client running on one or more of the client computers 605 and/or other servers Merely by way of example, the server(s) 615 can be one or more general purpose computers capable of executing programs or scripts in response to the user computers 605 and/or other servers 615, including without limitation web applications (which might, in some cases, be configured to perform methods of the invention). Merely by way of example, a web application can be implemented as one or more scripts or programs written in any programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from database clients running on a user computer 605 and/or another server 615. In some embodiments, an application server can create web pages dynamically for displaying the information in accordance with embodiments of the invention, such as providing information about validation and/or repair operations. Data provided by an application server may be formatted as web pages (comprising HTML, Javascript, etc., for example) and/or may be forwarded to a user computer 605 via a web server (as described above, for example). Similarly, a web server might receive web page requests and/or input data from a user computer 605 and/or forward the web page requests and/or input data to an application server.

In accordance with further embodiments, one or more servers 615 can function as a file server and/or can include one or more of the files necessary to implement methods of the invention incorporated by an application running on a user computer 605 and/or another server 615. Alternatively, as those skilled in the art will appreciate, a file server can include all necessary files, allowing such an application to be invoked remotely by a user computer 605 and/or server 615. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620. The location of the database(s) 620 is discretionary: merely by way of example, a database 620a might reside on a storage medium local to (and/or resident in) a server 615a (and/or a user computer 605). Alternatively and/or additionally, a database 620b can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, a database 620 can be a relational database, such as an Oracle database, that is adapted to store, update, and retrieve data in response to SQL-formatted commands. The database might be controlled and/or maintained by a database server, as described above, for example. In particular embodiments, the database server might be configured with DBMS software and/or storage management software.

While the invention has been described with respect to exemplary embodiments, one skilled in the art will recognize, based on the disclosure herein, that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A computer system, comprising:
a processor; and a computer readable medium in communication with the processor, the computer readable medium having encoded thereon a software program, the software program comprising:

a validation engine that is configured to:
receive a set of validation check data for validating a system environment for an application, the validation check data comprising information about one or more requirements for proper functioning of the application;
perform at least one validation check defined by the set of validation check data, the at least one validation check pertaining to at least one of the one or more requirements;
based on the at least one validation check, identify a system environment condition that needs to be repaired for proper functioning of the application; and
generate output comprising information about the identified system environment condition;

a listener that is configured to:
receive the output generated by the validation engine; and
based on the data about the identified system environment condition, invoke a repair engine to repair the identified system environment condition; and the repair engine that is configured to:
evaluate a repair rule corresponding to the identified system environment condition; and
based at least in part on an evaluation of the repair rule, perform a set of one or more operations to repair the identified system environment condition, so that the application can function properly.

2. The computer system of claim 1, wherein the set of one or more operations are performed in response to the repair engine being invoked by the listener and without user input to the repair engine.

3. The computer system of claim 1, wherein the output generated by the validation engine comprises an event, and wherein the listener is configured to receive the event.

4. The computer system of claim 1, wherein the listener is incorporated with the repair engine.

5. The computer system of claim 1, wherein the identified system environment condition is selected from the group consisting of:
a missing dependency;
an incorrect version of a dependency;
a dependency misconfiguration; and
an operating system misconfiguration.

6. The computer system of claim 1, wherein the listener is further configured to provide the information about the identified system environment condition to the repair engine.

7. The computer system of claim 1, wherein the listener is further configured to provide the repair rule to the repair engine.

8. The computer system of claim 7, wherein the validation engine is further configured to receive the repair rule, and wherein the information about the identified system event comprises the repair rule.

9. The computer system of claim 1, further comprising a data store configured to store a plurality of repair rules.

10. The computer system of claim 9, wherein the repair engine is configured to obtain the repair rule from the data store in response to being invoked by the listener.

11. The computer system of claim 1, wherein the software program is configured to provide output to a user comprising information about the repair rule and a result of the one or more operations performed to repair the identified system environment condition.

12. The computer system of claim 1, wherein the set of validation check data comprises the repair rule.

13. The computer system of claim 1, wherein the repair engine is further configured to generate a set of one or more repair engine events.

14. The computer system of claim 13, wherein the set of one or more repair engine events comprises an event providing notification that a repair operation has begun.

15. The computer system of claim 13, wherein the set of one or more repair engine events comprises an event providing notification of a completion status of a repair operation.

16. The computer system of claim 1, wherein the repair rule comprises a set of executable code that is executable to perform the one or more operations to repair the identified system environment condition.

17. The computer system of claim 16, wherein the set of executable code comprises one or more operating system commands.

18. The computer system of claim 16, wherein the set of executable code comprises one or more Java methods.

19. The computer system of claim 1, wherein the repair rule comprises:
a descriptor file comprising a namespace for the one or more operations to repair the identified system condition;
a plurality of sets of executable code that are executable to perform the one or more operations to repair the identified system condition; and
mapping data that maps the namespace to a first of the plurality of sets of executable code.

20. The computer system of claim 19, wherein the mapping data is specific to a type of system environment corresponding to the system environment for the application, and wherein the first set of executable commands are specific to the type of system environment.

21. The computer system of claim 1, wherein the software program is incorporated within an installation program for the application.

22. The computer system of claim 1, wherein the software program is configured to perform validation and repair procedures for a plurality of applications, based on sets of validation check data and repair rules specific to each of the plurality of applications.

23. The computer system of claim 22, wherein:
the application is a first application, the set of validation check data is a first set of validation check data, the at least one validation check is a first validation check, the system environment condition is a first system environment condition, the output is first output, the repair rule is a first repair rule, and the set of one or more operations is a first set of one or more operations;
the validation engine is further configured to:
receive a second set of validation check data for validating the system environment for a second application;
perform a second validation check defined by the second set of validation check data;
based on the second validation check, identify a second system environment condition that needs to be repaired for proper functioning of the second application; and
generate second output comprising information about the second identified system environment condition;
the listener is further configured to:
receive the second output;

based on the data about the second identified system environment condition, invoke the repair engine to repair the second identified system environment condition; and the repair engine is further configured to:
evaluate a second repair rule corresponding to second the identified system environment condition; and
based at least in part on an evaluation of the second repair rule, perform a second set of one or more operations to repair the second identified system environment condition, so that the second application can function properly.

24. The computer system of claim 23, wherein the first application is a primary application, and wherein the second application is an integrated application.

25. The computer system of claim 23, wherein the first application and the second application are unrelated applications.

26. A computer-implemented method of validating and repairing a system environment for an application, the method comprising:
receiving a set of validation check data for validating the system environment for the application;
performing, using a processor operatively coupled to a memory, at least one validation check defined by the set of validation check data;
based, at least in part, on the at least one validation check, identifying a system environment condition that needs to be repaired for proper functioning of the application;
evaluating a repair rule corresponding to the identified system environment condition; and
based at least in part on an evaluation of the repair rule, performing one or more operations to repair the identified system environment condition, so that the application can function properly.

27. The method of claim 26, wherein the validation check is performed at a validation engine, wherein the method further comprises:
generating, at the validation engine, output comprising information about the identified system environment condition;
receiving the output at a listener; and
invoking a repair engine based at least in part on the information about the identified system condition, wherein the repair rule is evaluated at the repair engine and the one or more operations are performed by the repair engine.

28. The method of claim 27, wherein generating output comprises triggering an event.

29. The method of claim 26, wherein:
the repair rule comprises:
a descriptor file comprising a namespace for the one or more operations to repair the identified system condition;
a plurality of sets of executable commands that are executable to perform the one or more operations to repair the identified system condition; and
mapping data that maps the namespace to a first of the plurality of sets of executable commands, the mapping data being specific to a type of system environment corresponding to the system environment for the application, and wherein the first set of executable commands are specific to the type of system environment; and
evaluating the repair rule comprises:
reading the descriptor file to identify a namespace for the one or more operations to repair the identified system condition;
reading the mapping data to identify, from the plurality of sets of executable commands, a first set of executable commands that corresponds to the system environment for the application; and
loading the first set of executable commands.

30. A tangible computer-readable medium having encoded thereon a set of instructions executable by one or more processors, the set of instructions comprising:
instructions for receiving a set of validation check data for validating the system environment for the application;
instructions for performing at least one validation check defined by the set of validation check data;
instructions for identifying based, at least in part, on the at least one validation check, a system environment condition that needs to be repaired for proper functioning of the application;
instructions for evaluating a repair rule corresponding to the identified system environment condition; and
instructions for performing one or more operations to repair the identified system environment condition, based at least in part on an evaluation of the repair rule, so that the application can function properly.

31. A computer-implemented method comprising:
storing first data that identifies first validation checks for validating a system environment for a first application, wherein the first application uses a second application;
storing second data that identifies second validation checks for validating a system environment for the second application;
storing third data that indicates that the first application uses the second application;
in response to a request to perform an operation that involves the first application, reading the third data to determine that validation checks identified in the first and second data need to be performed;
reading the first and second data to determine which validation checks, of the first and second validation checks, need to be performed;
performing, using a processor operatively coupled to a memory, at least one of the validation checks, from the first and second validation checks, that need to be performed;
based on the at least one of the validation checks, identifying a system environment condition that needs to be repaired for proper functioning of the first application;
evaluating a repair rule corresponding to the identified system environment condition, and
based at least in part on an evaluation of the repair rule, performing one or more operations to repair the identified system environment condition.

32. A computer-implemented method comprising:
storing, in association with an application, data that identifies validation checks for validating a system environment for the application;
wherein the data associates each mode of a plurality of modes with a subset of the validation checks;
in response to a request to perform an operation that involves the application,
determining a mode; of the plurality of modes, associated with the operation,
based on the data, determining the particular subset of validation checks that are associated with the mode; and
performing, using a processor operatively coupled to a memory, at least one of the validation checks in the particular subset of validation checks;

based on the at least one of the validation checks, identifying a system environment condition that needs to be repaired for proper functioning of the application;

evaluating a repair rule corresponding to the identified system environment condition, and based at least in part on an evaluation of the repair rule, performing one or more operations to repair the identified system environment condition.

* * * * *

UNITED STATES PATENT AND TRADEMARK OFFICE
CERTIFICATE OF CORRECTION

| | | |
|---|---|---|
| PATENT NO. | : 7,962,788 B2 | Page 1 of 1 |
| APPLICATION NO. | : 11/738946 | |
| DATED | : June 14, 2011 | |
| INVENTOR(S) | : Manglik et al. | |

It is certified that error appears in the above-identified patent and that said Letters Patent is hereby corrected as shown below:

In column 3, line 23, delete "and or" and insert -- and/or --, therefor.

In column 10, line 30, after "engine" insert -- 154. --.

In column 11, line 30, after "an" insert -- embodiment that consolidates the repair rule with other validation check data, the --.

In column 16, line 24, delete "and or" and insert -- and/or --, therefor.

In column 16, line 65, delete "and or" and insert -- and/or --, therefor.

In column 19, line 38, delete "embodiments embodiment," and insert -- embodiments, --, therefor.

In column 21, line 30, after "servers" insert -- 615. --.

In column 25, line 6-7, in Claim 23, delete "second the" and insert -- the second --, therefor.

In column 26, line 61, in Claim 32, delete "mode;" and insert -- mode, --, therefor.

Signed and Sealed this
Twenty-ninth Day of November, 2011

David J. Kappos
*Director of the United States Patent and Trademark Office*